Jan. 29, 1957  J. L. COLLINS  2,779,813
ELECTRICAL CAPACITOR
Filed Nov. 16, 1951

INVENTOR
JOSEPH L. COLLINS
BY
Dean Fairbank & Hirsch
ATTORNEYS

United States Patent Office 2,779,813
Patented Jan. 29, 1957

2,779,813

ELECTRICAL CAPACITOR

Joseph L. Collins, Mattapoisett, Mass., assignor to Aerovox Corporation, a corporation of Massachusetts Application November 16, 1951, Serial No. 256,792

9 Claims. (Cl. 174—52)

It is among the objects of the invention to provide an electrical capacitor construction which does not require the use of scarce or critical materials for the casing and in fact renders possible the use of a cardboard casing without requiring compressing strain thereupon for clenching the terminal lug mount in position yet affords a secure mount for the capacitor unit within the casing so that there is no likelihood of relative movement between such capacitor unit and the terminal lug mount with consequent short circuiting or breaking of the leads from such unit to the terminal lugs.

According to the invention, these objects are accomplished by the arrangement and combination of elements hereinafter described and particularly recited in the claims.

Figure 1:
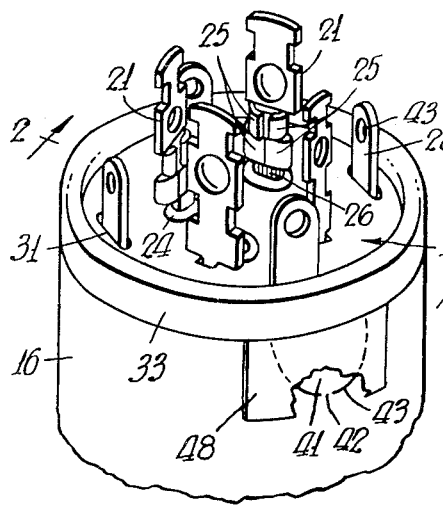
Figure 2:
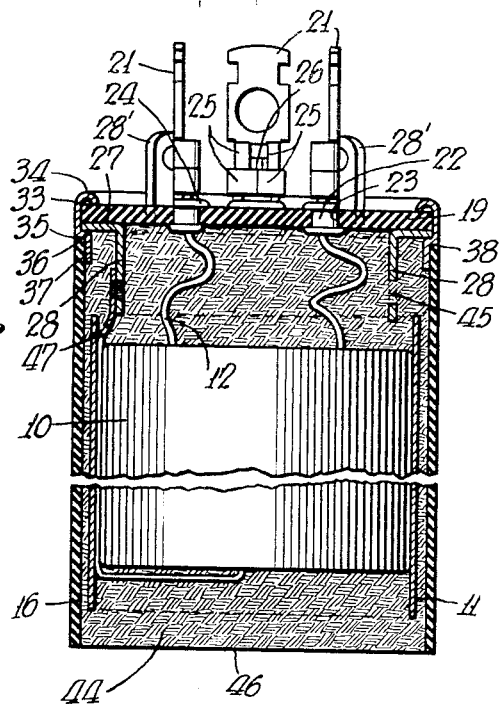
Figure 3:
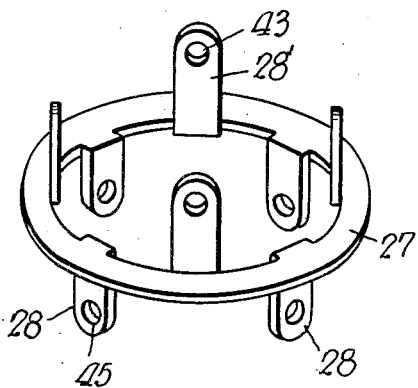
Figure 4:
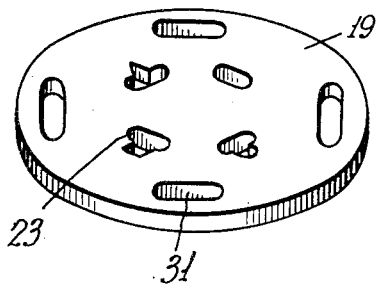

In the accompanying drawings in which is shown one or more of various possible embodiments of the several features of the invention, Fig. 1 is a fragmentary perspective view of the terminal lug mounting end of the capacitor, Fig. 2 is a longitudinal sectional view taken along line 2—2 of Fig. 1, Fig. 3 is a perspective view of one portion of the terminal lug mount, and Fig. 4 is a view similar to Fig. 3 of another portion thereof.

Referring now to the drawings, there is shown an electrical unit, illustratively a substantially tubular capacitor 10 which, in the usual multiple capacitor embodiment, comprises two or more capacitors wound as a single roll and suitably impregnated. The capacitor roll has a multiplicity of terminal leads 12 extending outward from its foil electrodes (not shown). The capacitor unit 10 which desirably has a wax paper covering 11 protruding beyond the ends thereof is housed in a tubular cardboard casing 16 of slightly greater diameter.

Associated with the capacitor unit 10 is a terminal lug mount 18, which desirably comprises a rigid disc 19, desirably of insulating material such as Bakelite or other suitable hard plastic. The disc 19 carries terminal lugs 21, preferably of the construction shown in Figs. 1 and 2, which extend outwardly from the disc 19 at substantially right angles thereto. Each terminal lug has a supporting eyelet 22 integral therewith and extending through a corresponding aperture 23, substantially midway between the center and the periphery of the disc 19, and clenched over as at 24. Desirably both the eyelet 22 and the aperture 23 are oval shaped to prevent rotation of the eyelet in the aperture. Each of the terminal lugs desirably has a pair of lateral wings 25 which are clenched over the protruding end of the respective leads 12 from the capacitor unit and clamp such leads firmly into electrical and mechanical contact with the associated terminal lug.

Associated with the disc 19 is a ring 27, preferably of metal, of outside diameter desirably equal to that of the disc, the ring desirably being formed with a plurality of fingers 28, 28' on the inner periphery thereof. Although any suitable number of fingers may be formed on the ring, in the embodiment herein, eight are provided. As shown in Fig. 3, alternate fingers 28, 28' are bent inwardly and outwardly at right angles to the ring, the outwardly bent fingers 28' extending respectively through a corresponding plurality of openings 31 arranged around the periphery of disc 19 so as to extend substantially parallel to terminal lugs 21. The fingers 28' which extend through the disc 19 serve to mount the capacitor to the chassis of electrical equipment in conventional manner, such as for example, by passing such fingers through suitable openings in the chassis and bending them inwardly or outwardly as desired.

Associated with the terminal lug mount 18 is an annular retaining member which may comprise a metal collar 33 of reduced diameter at one end as at 37 defining an internal annular shoulder 36 on which the periphery of ring 27 may be seated. Rim 34 of the collar 33 is desirably clenched over the periphery of disc 19 securely to clamp the disc 19 and ring 27 together and to retain the latter seated on shoulder 36.

The diameter of the reduced end 37 of the collar is desirably such that it may be telescoped into the end of the cardboard casing 16 so as to fit snugly therein, the external annular shoulder 35 of the collar abutting against the rim 38 of the casing to limit the inward movement of said reduced end into the casing.

As shown in Fig. 1 a flap 41 cut out from the side wall of the tubular casing 16 adjacent rim 38 thereof and hinged as at 42, defines an opening 43 which serves for admission of suitable filling or sealing material 44 such as pitch, sealing wax or the like. The molten sealing material 44 is poured into such opening 43 desirably with the casing on its side and will flow around the leads 12, the inturned fingers 28 and the common lead 47 from capacitor unit 10 which is connected to one of the fingers 28, substantially completely filling the space between the end of the capacitor unit 10 and the disc 19 and will also flow around such unit 10. Upon cooling and hardening of the filling material which passes through the apertures 45 in the respective inwardly extending fingers 28 it will adhere to the cardboard casing as well as to the leads 12 and 47 and the inturned fingers 28, securely bonding together the terminal lug mount 18, the capacitor unit 10 and the casing 16.

To complete the assembly, the open end 46 of the casing is filled with the sealing material 44 and a strip of pressure adhesive tape 48 such as "cellophane" or the like may retain the cover flap 41 in sealed position.

Since the rim 34 of collar 33 is rolled inward in preparing the terminal lug mount as a sub-assembly, the casing 16 is not subjected to compressive strain in such machining operation. That casing is quite adequate for its purpose though made of cardboard rather than of scarcer or critical or expensive metal.

The sealing material which bonds to the casing 16 and the leads 12 and 47, and extends through apertures 45 in the inwardly extending fingers 28 will provide firm support for the electrical unit and prevent any relative twisting movement between the electrical unit and the leads thereto even under severe conditions of vibration and shock. Consequently, there is little likelihood of breaking of such leads which would render the electrical unit inoperative.

As many changes could be made in the above construction and method and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In an electrical device of the type comprising an electrical unit with a plurality of leads extending therefrom, a substantially cylindrical casing encompassing said electrical unit, a terminal lug mount comprising an insulating disc having a terminal lug rigidly affixed thereto to which one of said leads is affixed and a mounting ring in juxtaposition with said disc; the combination therewith of means on said ring to key the latter to said disc, inwardly projecting means on said ring extending at substantially right angles thereto, and sealing material in said casing coacting with said inwardly projecting means, said electrical unit, and the lead therefrom to said terminal lug, to prevent relative movement between said electrical unit and said terminal lug mount.

2. The combination set forth in claim 1 in which an annular retaining member is provided comprising a collar encompassing the peripheries of said disc and said mounting ring, said collar having means thereon securely to clamp said disc and said mounting ring together, and means securely to retain said collar in fixed position with respect to said casing.

3. In an electrical device of the type comprising an electrical unit with a plurality of leads extending therefrom, a substantially cylindrical casing encompassing said unit, a terminal lug mount comprising an insulating disc having a plurality of terminal lugs affixed thereto to which said leads are affixed respectively and a mounting ring in juxtaposition with said disc; the combination therewith of means on said ring to key the latter to said disc, inwardly projecting means on said ring extending at substantially right angles thereto, an annular retaining member comprising a collar encompassing the peripheries of said disc and said mounting ring, means on said collar securely to clamp said mounting ring and said disc together, said collar having a reduced end of diameter such as to fit snugly within the end of said cylindrical casing, and sealing material in said casing bonding to said inwardly projecting means, said electrical unit and the leads therefrom to said terminal lugs to prevent relative movement between said electrical unit and said terminal lug mount.

4. In an electrical device of the type comprising an electrical unit with a plurality of leads extending therefrom, a terminal lug mount comprising an insulating disc having a plurality of terminal lugs affixed thereto to which said leads are affixed respectively, and a mounting ring in juxtaposition with said disc; the combination therewith of a substantially cylindrical cardboard casing encompassing said unit, means on said ring to key the latter to said disc, inwardly projecting means on said ring extending at substantially right angles thereto, an annular retaining member comprising a collar encompassing the peripheries of said disc and said mounting ring, said collar being of reduced diameter at one end defining an internal and external annular shoulder, means on said collar securely to clamp said disc and said ring against said internal annular shoulder, the reduced end of said collar being of diameter such as to fit snugly within the end of said cylindrical casing with the rim of the latter against said external annular shoulder, and sealing material in said casing bonding thereto and to said inwardly projecting means, said electrical unit and the leads therefrom to said terminal lugs, to prevent relative movement between said electrical unit and said terminal lug mount.

5. The combination set forth in claim 4 in which said cardboard casing has an opening therein adjacent the terminal lug mount for admission of said sealing material.

6. The combination set forth in claim 4 in which said cardboard casing has an opening therein adjacent the terminal lug mount for admission of said sealing material, said opening having a cover flap hinged thereto to seal said opening.

7. As an article of manufacture, a terminal lug mount comprising an insulating disc having a plurality of terminal lugs affixed thereto and having a plurality of apertures therethrough spaced therearound substantially midway between the center of said disc and the periphery thereof, a mounting ring in juxtaposition with said disc, said mounting ring having a plurality of fingers on the inner periphery thereof, alternate fingers being bent inwardly and outwardly at right angles to the ring, said outwardly bent fingers extending through said apertures respectively to key the ring to said disc, and an annular retaining member comprising a collar encompassing the peripheries of said disc and said mounting ring, said collar being of reduced diameter at one end defining an internal and external annular shoulder, said collar having means thereon securely to clamp said disc and said ring against said internal annular shoulder.

8. An article of manufacture comprising an electrical unit with a plurality of leads extending therefrom, a terminal lug mount comprising an insulating disc having a plurality of terminal lugs affixed thereto to which said leads are affixed respectively, a mounting ring in juxtaposition with said disc, said mounting ring having a plurality of fingers on the periphery thereof, alternate fingers being bent inwardly and outwardly at right angles to the ring, said outwardly bent fingers extending through corresponding apertures in said disc, an annular retaining member comprising a collar encompassing the peripheries of said disc and said mounting ring, said collar having means securely to clamp said mounting ring and said disc together and sealing material bonding to said inwardly projecting fingers, said electrical unit and the leads therefrom to said terminal lugs, to prevent relative movement between said electrical unit and said terminal lug mount.

9. In an electrical device of the type comprising an electrical unit with a pair of leads extending therefrom, a substantially cylindrical casing encompassing said electrical unit, a terminal lug mount comprising an insulating disc having a terminal lug rigidly affixed thereto to which one of said leads is affixed and a mounting ring in juxtaposed position with said disc; the combination therewith of means on said ring to key the latter to said disc, inwardly projecting means on said ring extending at substantially right angles thereto, the other of said pair of leads being electrically and mechanically connected to one of said inwardly projecting means on said ring, and sealing material in said casing coacting with said inwardly projecting means, said electrical unit, and the leads therefrom to prevent relative movement between said electrical unit and said terminal lug mount.

References Cited in the file of this patent

UNITED STATES PATENTS

| | | |
|---|---|---|
| 1,842,376 | Fried | Jan. 26, 1932 |
| 1,948,506 | Caine | Feb. 27, 1934 |
| 2,194,703 | Kater | Mar. 26, 1940 |
| 2,202,166 | Peck | May 28, 1940 |
| 2,298,441 | Waterman | Oct. 13, 1942 |